(12) United States Patent
Hu et al.

(10) Patent No.: US 10,587,637 B2
(45) Date of Patent: Mar. 10, 2020

(54) PROCESSING NETWORK TRAFFIC TO DEFEND AGAINST ATTACKS

(71) Applicant: Alibaba Group Holding Limited, George Town (KY)

(72) Inventors: Min Hu, Hangzhou (CN); Huilai Qiao, Hangzhou (CN); Jiong Jia, Hangzhou (CN); Yi Chen, Hangzhou (CN)

(73) Assignee: Alibaba Group Holding Limited (KY)

( * ) Notice: Subject to any disclaimer, the term of this patent is extended or adjusted under 35 U.S.C. 154(b) by 215 days.

(21) Appl. No.: 15/643,948

(22) Filed: Jul. 7, 2017

(65) Prior Publication Data

US 2018/0020016 A1    Jan. 18, 2018

(30) Foreign Application Priority Data

Jul. 15, 2016  (CN) .......................... 2016 1 0561330

(51) Int. Cl.
*H04L 29/06* (2006.01)
*H04L 12/26* (2006.01)
*H04L 12/707* (2013.01)
*H04L 12/741* (2013.01)

(52) U.S. Cl.
CPC ........ *H04L 63/1425* (2013.01); *H04L 43/028* (2013.01); *H04L 43/0835* (2013.01); *H04L 45/24* (2013.01); *H04L 63/10* (2013.01); *H04L 63/1408* (2013.01); *H04L 63/1458* (2013.01);
(Continued)

(58) Field of Classification Search
CPC ..... H04L 63/10; H04L 63/14; H04L 63/1408; H04L 63/1416; H04L 63/1425; H04L 63/1433; H04L 63/1441; H04L 63/1458; H04L 63/145; H04L 63/20
See application file for complete search history.

(56) References Cited

U.S. PATENT DOCUMENTS

| 8,432,789 B2 | 4/2013 | Zhang |
| 9,253,206 B1 | 2/2016 | Fleischman |
| 9,264,301 B1* | 2/2016 | Chua ........................ H04L 45/02 |

(Continued)

FOREIGN PATENT DOCUMENTS

| CN | 1423876 | 6/2003 |
| CN | 104954367 | 9/2015 |

(Continued)

*Primary Examiner* — Edward Zee
(74) *Attorney, Agent, or Firm* — Van Pelt, Yi & James LLP

(57) ABSTRACT

Network traffic processing includes: determining whether one or more packets of network traffic associated with a first public network address have been dropped, the first public network address being associated with a target host; in response to the determination that the one or more packets associated with the first public network address have been dropped, assigning a second public network address to the network traffic and generating a forwarding path corresponding to the second public network address, wherein the second public network address is configured to receive the network traffic, and wherein the forwarding path is configured to forward the network traffic received at the second public network address to the target host; and notifying a filtering device to transmit the network traffic to the second public network address and cause the network traffic to be forwarded to the target host according to the forwarding path.

19 Claims, 6 Drawing Sheets

(52) U.S. Cl.
CPC .............. *H04L 63/20* (2013.01); *H04L 45/22* (2013.01); *H04L 45/74* (2013.01); *H04L 63/1416* (2013.01)

(56) References Cited

U.S. PATENT DOCUMENTS

| | | |
|---|---|---|
| 9,742,795 B1 * | 8/2017 | Radlein ............... H04L 63/1441 |
| 2008/0320151 A1 | 12/2008 | McCanne |
| 2012/0124666 A1 | 5/2012 | Kim |
| 2014/0109225 A1 * | 4/2014 | Holloway ........... H04L 63/1458 |
| | | 726/23 |
| 2014/0331308 A1 | 11/2014 | Smith |
| 2015/0026800 A1 | 1/2015 | Jain |
| 2015/0237059 A1 | 8/2015 | Aoki |
| 2015/0281085 A1 | 10/2015 | Phaal |
| 2016/0036837 A1 | 2/2016 | Jain |
| 2017/0070531 A1 | 3/2017 | Huston, III |

FOREIGN PATENT DOCUMENTS

| | | |
|---|---|---|
| CN | 105049441 | 11/2015 |
| CN | 105516129 | 4/2016 |
| CN | 105591963 | 5/2016 |
| CN | 102195843 | 9/2017 |
| JP | 2007019981 A | 1/2007 |
| JP | 2008177714 A | 7/2008 |
| JP | 2015091106 A | 5/2015 |
| JP | 2015154326 A | 8/2015 |
| WO | 0167685 A2 | 9/2001 |
| WO | 2008080416 | 7/2008 |

* cited by examiner

PROCESSING NETWORK TRAFFIC TO DEFEND AGAINST ATTACKS

CROSS REFERENCE TO OTHER APPLICATIONS

This application claims priority to People's Republic of China Patent Application No. 201610561330.7 entitled METHOD AND DEVICE FOR THE PROCESSING OF NETWORK TRAFFIC, filed Jul. 15, 2016 which is incorporated herein by reference for all purposes.

FIELD OF THE INVENTION

The present invention generally relates to the field of network security, and more particularly, to systems and methods for processing network traffic to counter network attacks.

BACKGROUND OF THE INVENTION

A Distributed denial of service (DDoS) attack is a form of an attack under which the computing resources (e.g., servers) are overpowered by a deluge of data traffic and thus become unavailable to the intended users. DDoS attacks utilize a multitude of computers as attack sources to launch DDoS attacks against one or more targeted computing resources. Assisted with the client-server technology, the power of denial of service attacks can be increased exponentially. For example, an attacker often first installs a master control program on one computer, and then, within a predetermined period of time, the master control program communicates with a large number of agent programs, which have also already been installed on multiple computers on the Internet. Upon the receipt of a command from the master control program, the agent programs immediately launch the attack accordingly. Therefore, with such distributed client-server technology, the master control program is able to activate hundreds or thousands of agent programs into attacking operation within seconds.

The technique of black hole routing (i.e., a specific static routing) is a technique to absorb oblivious routes so that they have no route for return. Black hole routing renders the irrelevant routes, even those with an incoming route, no longer having a return route associated therewith. For example, in general, such routes are the routing entries established by an administrator of a network system. The administrator can set the specified source address of a routing path to an interface of null0 (e.g., a designation for a non-existent interface). From the perspective of network security, this operation results in the silent drop of all of the data packets routed by the particular routing path without specifying any reason. Thus, the impact on system backbone can be minimized by taking sufficient advantage of the packet forwarding capabilities of the routers.

In general, a malicious traffic defense system (e.g., a cloud-based DDoS protection system) includes three major elements: a traffic detection device, a traffic filtering device, and a monitoring and management device. The traffic detection device is responsible for detecting attack traffic as well as notifying and activating the protection system to perform traffic filtering upon the detection of an attack. The traffic filtering device is responsible for using specialized traffic filtering mechanisms to redirect the suspicious traffic from the original network routing path to the filtering mechanism, and for recognition and elimination of the malicious traffic. After the filtering, the filtering device reinjects the filtered out, legitimate traffic free of attack data packets back into the original network routing path for forwarding to the target host, without affecting the forwarding path of the legitimate traffic. The monitoring and management device is responsible for centrally managing and configuring the traffic filtering device, displaying real-time traffic and warning events, monitoring status information, and timely generating reports on traffic analysis, attack statistics, and the like.

Cloud computing is a computation model for increasing, utilizing, and delivering network-based computing services. Typically, cloud computing provides for computing resources that are dynamically scalable and oftentimes virtualized, over a network such as the Internet.

A software defined network (SDN), a relatively new type of network architecture, is one of the solutions for achieving network virtualization. The core concept of SDNs lies in achieving software self-defined routing by separating the control plane and the data path plane of the network elements. The control plane performs configuration and management functions, and the data path plane performs packet processing functions. For example, virtual private cloud (VPC) networks currently provided by cloud service providers are one specific implementation of the SDN architecture. In VPC networks, self-defined forwarding routes are accomplished by use of tunneling of virtual extensible local area networks (VXLAN).

Presently, with the fast growth of cloud-based computing, numerous users have moved their businesses or operations onto public cloud systems. However, at the same time, DDoS attacks against cloud users continue to increase. Because of the limitation of the server bandwidth, when attack traffic exceeds a tolerated range of the server bandwidth, in order not to affect other businesses or operations serviced by the same server, service providers oftentimes employ the black hole routing to screen the IP address under the attack. As a result, intended users are no longer able to access the services at the IP address under the black hole filtering.

FIG. 1 is a block diagram of an example of a conventional system for defending against volume-based DDoS attacks by separately establishing a specialized cloud-based DDoS protection system 122. As shown in FIG. 1, a protected host 128 can have its IP address resolved by a domain name server (DNS) (not shown) to a virtual IP address provided by the specialized DDoS protection system 122. Accordingly, along path (1), the traffic from a remote client or server 120 requesting service from the protected host 128 (including both intended user access traffic and DDoS attack traffic) is directed to the virtual IP address associated with the specialized cloud-based DDoS protection system 122 via the translation service of the DNS. Thus, the traffic first is routed to the specialized cloud-based DDoS protection system 122, and then filtered thereby. Subsequently along path (2), the intended user traffic is forwarded to its destination address at the public cloud service 124. Lastly, along path (3), a router 126 of the cloud service 124 forwards the intended user access traffic to the protected host 128.

However, the above described system has flaws. FIG. 2 is a diagram illustrating a DDoS attack bypassing the conventional specialized cloud-based DDoS protection system 122 and directly targeting the protected host 128, causing the services provided at the protected host 128 no longer accessible to intended users. Sometimes due to reasons such as disclosure through DNS resolution history records, unintentional or inadvertent disclosure by intended users, or discovery or theft by use of scanning techniques, etc., the source IP address of the protected host 128 (i.e., the IP address included in traffic data returned in response to legitimate access requests) is revealed to an attacker. Consequently, as shown herein, along path (1), the attacker can bypass the specialized cloud-based DDoS protection system 122 when initiating a DDoS attack from the remote client/remote server 130 and directly concentrate the DDoS attack traffic onto the protected host 128. For example, suppose that a protected host has an IP address of 123.4.5.6, and a corresponding virtual IP address of 10.1.2.3. If the IP address of 123.4.5.6 is revealed, the attacker will attack this IP address. As a result, the protected host 128 can no longer handle the large volume of traffic data caused by the DDoS attack and has to resort to black hole routing as a protective counter measure. In this case, the router 126 will drop packets destined for 123.4.5.6. Along paths (2) and (3), the intended user access traffic is forwarded by the specialized cloud-based DDoS protection system 122 and then to the protected host 128, only to be discarded by router 126 due to black hole routing. Therefore, along path (4), the intended user access traffic can no longer reach the protected host 128 when the prior art defense is under afore-described DDoS attack.

Thus, there is a need to address the flaws of the conventional DDoS defense systems.

BRIEF DESCRIPTION OF THE DRAWINGS

Various embodiments of the invention are disclosed in the following detailed description and the accompanying drawings.

The drawings described here are intended to further the understanding of the present invention, and form a part of the present application. The exemplary embodiment in the present application and its description are intended to explain the present invention, and do not constitute inappropriate limitation of the scope of the present invention. Among the drawings.

DETAILED DESCRIPTION

Figure 1:
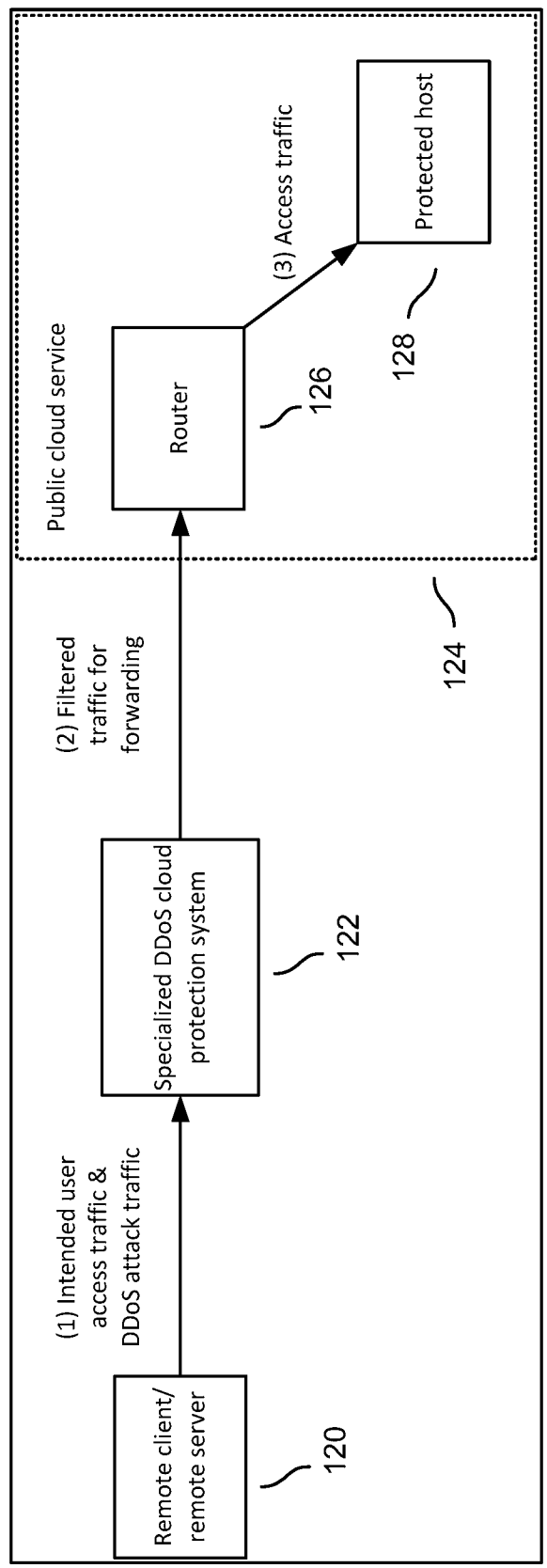
FIG. 1 is a schematic functional diagram of a prior art defense system against volume-based attacks such as DDoS attacks by use of a separate specialized cloud-based DDoS protection system.
Figure 2:
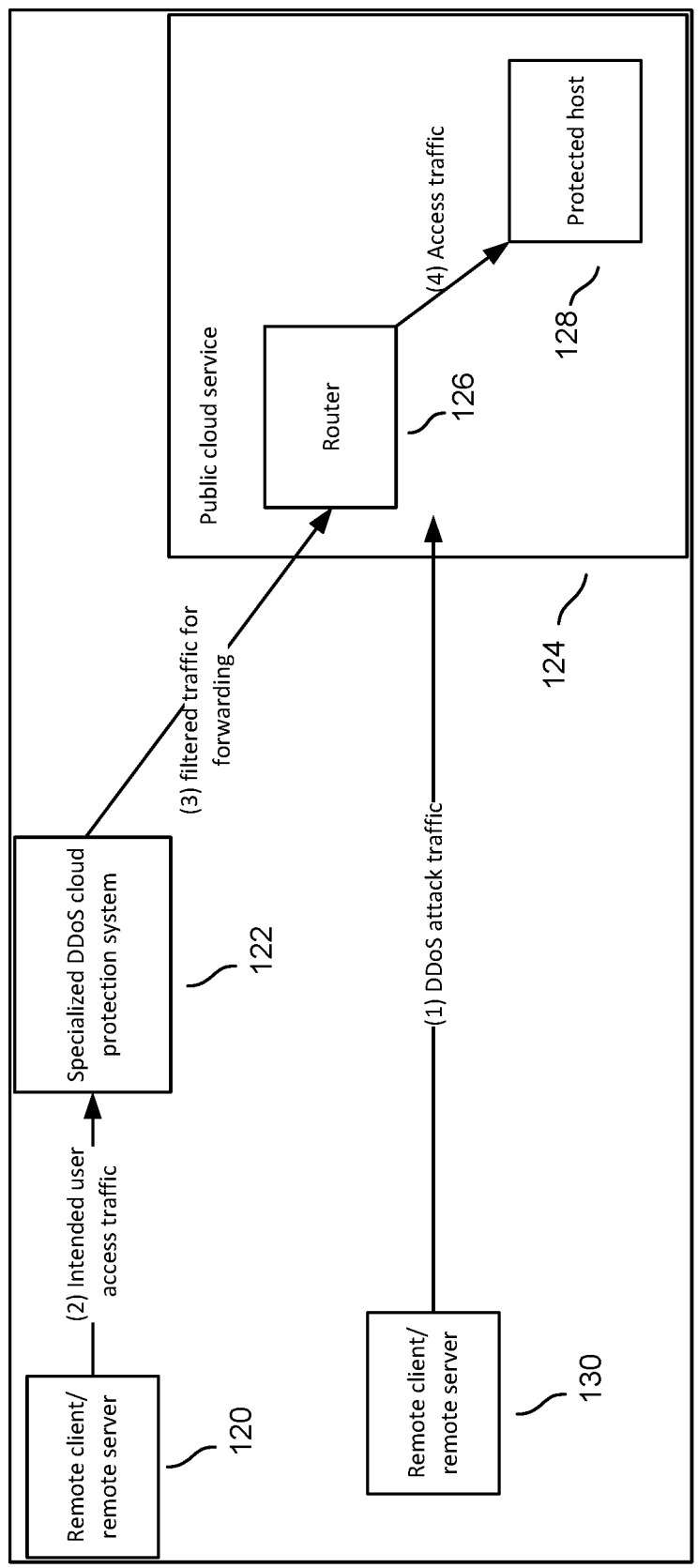
FIG. 2 is a schematic functional diagram illustrating the business serviced at the protected host of FIG. 1 becoming unavailable under a scenario where a DDoS attacker bypasses the cloud-based DDoS protection system of FIG. 1 and directly attacks the protected host of FIG. 1.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

It must be noted that the terms "first," "second," etc., in the description and claims of the present invention, as well as in the drawings, are used to differentiate similar objects, and are not necessarily intended to describe a specific order or sequence. It should be understood that data used in this way is interchangeable in the appropriate situations, so that the embodiments of the present invention described here can be implemented in sequences additional to those shown or described here. Moreover, the terms "includes," "comprises," and "has" and any variations thereof are intended to cover non-exclusive inclusion; for example, processes, methods, systems, products, and equipment that include a series of steps or units are not necessarily limited to the steps or units that are explicitly enumerated, but may comprise other steps or units that are not explicitly enumerated or are inherent to these processes, methods, systems, products or equipment.

Figure 3:
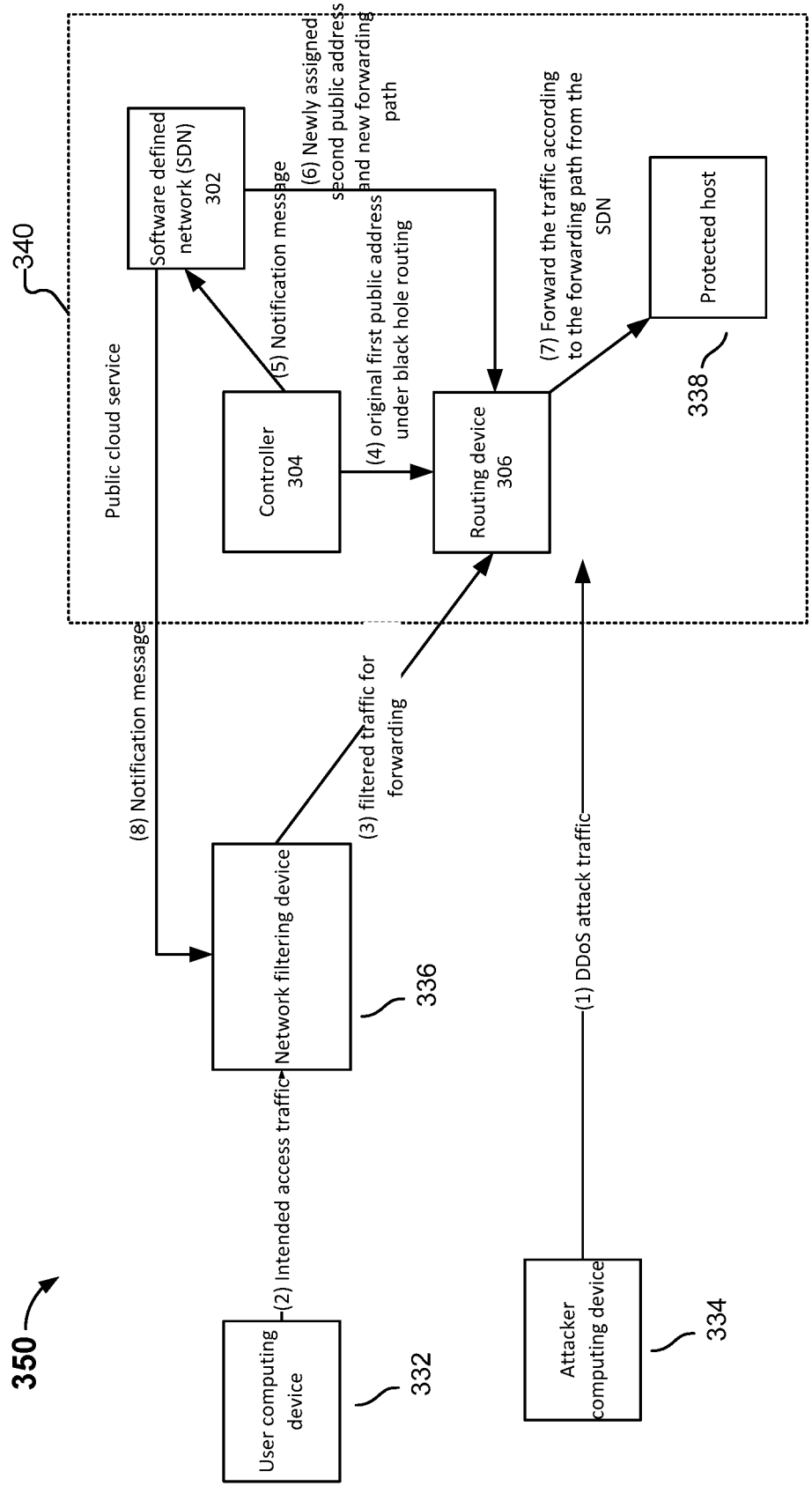
FIG. 3 is a schematic functional diagram of an example system for processing network traffic to counter DDoS attacks, illustrated in the context of a communication system, in accordance with one or more embodiments of the present disclosure.

FIG. 3 is a block diagram of an example system for processing network traffic to counter malicious attacks (e.g., DDoS attacks), illustrated in the context of a communication system 350 and in accordance with an embodiment of the present disclosure. As shown in FIG. 3, the communication system 350 includes a user computing device 332, an attacker computing device 334, a network filtering device 336, and a cloud service 340 provided by a service provider. The cloud service 340 is provided on a platform that includes an SDN 302, a controller 304 (e.g., a network management server), a routing device 306 (e.g., a router), and one or more protected hosts 338 (e.g., servers).

The user computing device 332 can be, for example, a remote client or remote server by which the user transmits service access requests to the services hosted at the protected host 338. The attacker computing device 334 can also be, for example, a remote client or server that the attacker uses to initiate DDoS attack against the services hosted at the protected host 338. The user computing device 332 and attacker computing device 334 can be a client computing device or server computing devices, and can include one or more devices such as personal computers, laptops, personal digital assistants (PDAs), smart phones, wearable devices, standalone servers, distributed servers, or the like, with one or more wired, wireless, or any other suitable communication connections to the communication system 350.

In general, the user computing device and the attacker computing device behave differently. To access the services provided at the protected host 338, a legitimate user transmits, via the user computing device 332, legitimate traffic directed to the virtual IP address of the protected host (e.g., 10.1.2.3). The legitimate traffic is routed through the network filtering device 336 before reaching the services provided at the protected host 338. On the other hand, by use of the attacker computing device 334, the attacker can transmit data packets directly targeting the protected host 338 at the public cloud 340 by specifying the address of the protected host 338 (e.g., 123.4.5.6). It should be noted that although one intended user device 332, one DDoS attacker device 334, one filtering device 336, and one protected host 338 are shown in FIG. 3 for the purpose of illustration, the technique can be applied to a plurality of intended user devices, attacker devices, filtering devices, protected servers, and the like.

In this example, the protected host is configured to be associated with a public network address and a private address. Similar to the system shown in FIG. 1, for incoming traffic, the DNS resolves the virtual IP address to the public network address. An additional network address translation is performed to map the public network address to the private address of the protected host, and a forwarding path between the public network address and the private address is maintained. Incoming traffic mapped to the public network address is translated and forwarded to the private address, and return traffic is returned from the public network address. Since the private address information is not included in return traffic, the attacker cannot gain knowledge of the private address by examining return traffic. As will be described in greater detail below, during an attack, the SDN can use multiple public network addresses for the same protected host, thus allowing legitimate traffic and attack traffic to be separated. This way, legitimate traffic can pass through while attack traffic can be dropped.

The public cloud service 340 comprises an SDN 302, a controller 304, a routing device 306, and a protected host 338. The SDN can be implemented, for example, but not limited to, in wide area networks (WANs), local area networks (LANs), the Internet, metropolitan area networks (MANs), ISP backbones, data centers, and the like. The SDN 302 includes one or more computing devices implementing the functions of one or more network elements such as a router, switch, bridge, load balancer, etc. In some embodiments, the SDN can be implemented as networking functions or programs executing on virtual machines. In this example, the control plane and the data path plane of the SDN are implemented as separate logical components. Further, the control plane of the SDN is separate from the controller 304.

In this example, packets filtered and forwarded by the network filtering device 336 have a destination address that maps to a first public network address of the protected host. The SDN 302 is configured to detect whether the network traffic (e.g., data packets associated with a network flow) filtered and forwarded by the network filtering device 336 to the first public network address is dropped. The network filtering device 336 receives forwarding path information from the SDN and forwards network traffic to the target host according to the forwarding path information. When it is detected that the amount of traffic (e.g., measured in bandwidth consumed, number of packets, or other appropriate measurement) destined for the first public network address exceeds a threshold (thus indicating that an attack on the first public network address is underway), the network filtering device will drop packets destined for the first public network address. In response to a determination that the packets filtered and forwarded by the network filtering device to the first public network address are dropped, the SDN will assign a second public network address for such traffic and generate a forwarding path corresponding to the second public network address. The second public network address associated with the traffic is a newly configured address that is different from the first public network address. Further, the SDN 302 is configured to send a notification message to the network filtering device 336, notifying the network filtering device 336 to change the destination of the filtered traffic and send the filtered traffic destined for the protected host 338 to the second public network address instead. The network filtering device can update the destination of the network traffic (e.g., the destination field of the packets associated with a network flow) from the first public network address to the second public network address. In this way, the forwarding path is generated, and the forwarded traffic is sent to the protected host 338 according to the forwarding path corresponding to the second public network address.

The controller 304 carries out control functions by sending commands (e.g., preformatted messages). The controller is configured to send to the SDN 302 a notification message when the controller 304 determines that the amount of traffic to the first public network address exceeds the pre-determined threshold and the routing device 306 is to drop the incoming traffic destined to the first public network address. The routing device 306 is configured to receive the forwarding path from the SDN 302, and to forward the traffic to the target host 338 according to the forwarding path.

In particular, as shown in FIG. 3, along path (1), when a DDoS attacker is able to obtain the public network address associated with the protected target host 338, the attacker can launch DDoS attacks directly against the public network address of the protected target host 338 from the attacker computing device 334. Under a malicious attack with a large volume of DDoS traffic, the public network address associated with the protected target host 338 is subjected to black hole routing in which packets destined to the public network address are dropped. At the same time, along path (2), the intended user still transmits traffic from the user computing device 332 to access the services provided by the protected host 338, and the traffic data has the same public network address as the public network address targeted by the attacker. When the network filtering device 336, such as an inbound filter, performs filtering on the intended user traffic data and accordingly forwards the legitimate or "clean" traffic to protected host 338 along path (3) via routing device 306, the legitimate traffic nevertheless is subject to the black hole routing together with the attack traffic sent by the attacker, and is also discarded. As a result, without special techniques described below, the intended user access to the services provided by the protected host 338 would be affected by the DDoS attacks.

Along path (4), before a local area network on which the protected target host 338 resides joins the SDN 302, the public network address is converted to a private address pre-configured for the protected target host 338 by using a network address translation service. In some embodiments, such translation is performed by the controller 304 sending a control command or message to the routing device 306. For example, after the controller 304 transmits the public network address to the routing device 306 and confirms that the traffic reaches the public network address, the controller 304 updates a one-to-one mapping table that maps the public network address to the private address of the protected host to generate a forwarding path. As a result, traffic sent to the public network address is forwarded to the protected target host 338 according to the forwarding path.

In this example, once the local area network where the protected target host 338 resides joins the SDN 302, the conversion of the public network address to the private address pre-configured for the protected host 338, by using the network address translation service, is no longer performed by the controller 304 sending a control command to the routing device 306. Instead, the controller 304 is primarily responsible for monitoring the amount of traffic sent to the public network address, which is included in the forwarding path issued by the controller 304 to the routing device 306. The controller can issue the forwarding path in a message with predefined fields. In the event that the amount of traffic sent to the public network address exceeds a pre-determined threshold, the controller 304 implements black hole routing for the public network address in order to control traffic sent by the routing device 306 to the public network address, and makes the traffic to be forwarded pass through the black hole routing.

Along path (5), the controller 304 sends a notification message to the SDN 302 to indicate that the controller 304 has implemented black hole routing for the public network access address. At this point, the conversion of the public network address to a private address pre-configured for the protected host 338, by use of a network address translation service, is no longer performed by the controller 304 sending a control command to the routing device 306, but is performed by the SDN 302 instead.

Along path (6), when it is determined that the first public network address is subject to black hole routing, the SDN 302 ensures that legitimate traffic forwarded by the network filtering device 336 and destined for the first public network address is not dropped together with malicious attack traffic sent by attackers. In other words, the SDN is configured to ensure that legitimate access traffic is forwarded normally to the protected target host 338. In this example, the SDN 302 separately configures a second public network address for the legitimate traffic forwarded by the network filtering device 336 to the protected host 338. In this manner, the intended user visit traffic forwarded from the network filtering device 336 to the protected target host 338 is no longer sent together with the malicious traffic from the attackers to the same first public network address being black hole routed. Instead, the legitimate traffic is transmitted to the newly-configured, second public network address.

In this example, the control plane of the SDN 302 is used to configure a second public network address different than a first public network address configured by the above-described controller 304. The second public network address and its mapping to the private network address of the host can be stored in the control plane. Next, the SDN's control plane notifies the data path plane of the newly-configured second public network address. Then, a forwarding strategy of the SDN is updated with the newly-configured second public network address. As a result, the original forwarding path from the first public network address to the protected target host 338 is updated to a new forwarding path from the second public network address to the protected target host 338. In other words, the traffic forwarded to the second, newly-configured public network address is to be sent to the protected target host 338 according to the new forwarding path.

After the forwarding strategy of the data path plane of the SDN 302 is updated with a second public network address, the original forwarding path from the first public network address to the protected target host 338 is updated to be the second forwarding path from the newly-configured second public network address to the protected target host 338. In particular, the SDN 302 utilizes the data path plane to issue the second forwarding path to the routing devices 306. As a result, in addition to the original forwarding path from the first public network address to the protected target host 338, the second forwarding path from the second public network address to the protected target host 338 is further included on the routing devices 306.

Along path (7), under the control of both the controller 304 and the SDN 302, upon receiving traffic accessing the first public network address, the routing device 306 drops the traffic via the black hole routing. On the other hand, upon receiving traffic accessing the newly-configured second public network address, the routing device 306 forwards the traffic to the protected target host 338.

Lastly, along path (8), the SDN 302 sends a notification message to the network filtering device 336 to update the forwarding address for the traffic from the original first public network address to the newly-configured second public network address. Prior to receiving the notification message from the SDN 302, because the legitimate traffic forwarded by the filtering device 336 to the protected target host 338 is sent together with the attack traffic from attackers to the original first public network address, which has been subject to the black hole routing, the legitimate traffic is dropped. However, once the filtering device 336 receives the notification message from the SDN 302, the filtering device 336 changes the forwarding address of the traffic from the original first public network address to the newly-configured second public network address. By forwarding the legitimate traffic to the newly-configured second public network address, from which the traffic is further forwarded to the protected target host 338 via the forwarding path from the newly-configured second public network address to the protected target host 338, the legitimate traffic filtered by the network filtering device 336 for visiting the protected host 338 is transmitted without interruption despite the ongoing DDoS attacks. Thus, the services provided by the protected target host 338 remain accessible to the intended users normally.

Figure 4:
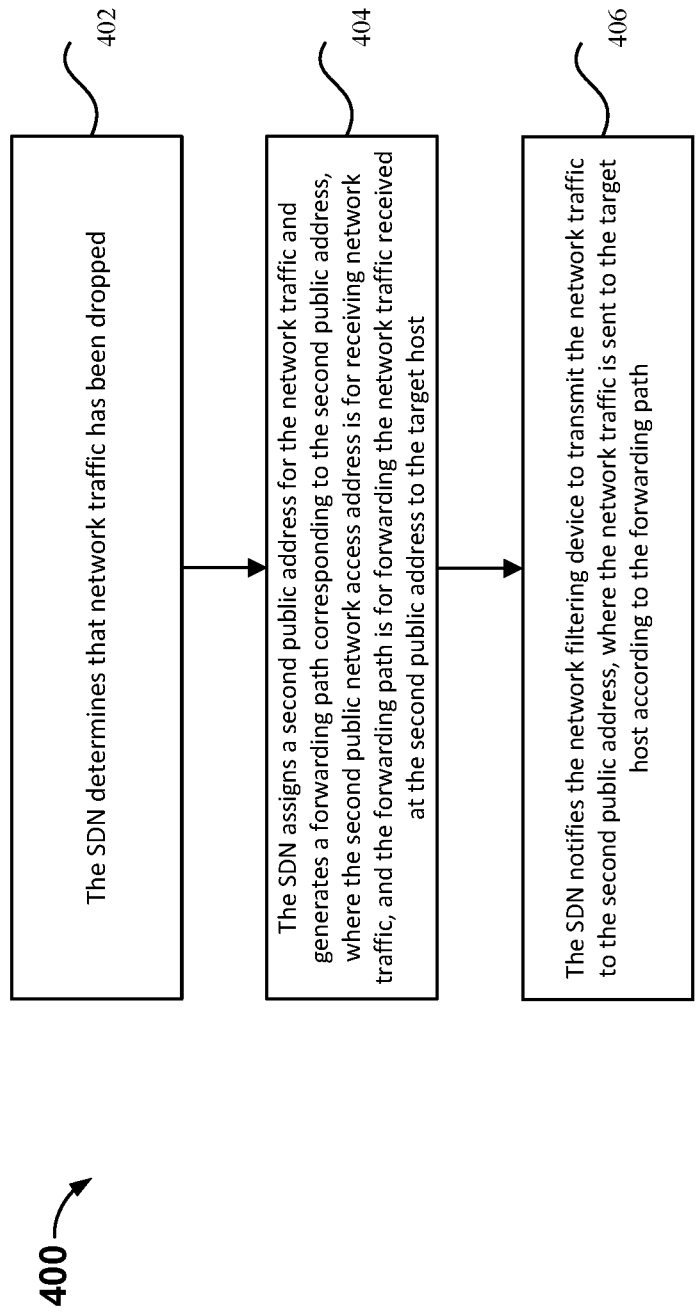
FIG. 4 is a flow chart of an example method for processing network traffic to counter DDoS attacks, in accordance with one or more embodiments of the present disclosure.

FIG. 4 shows a flow chart of an example process for processing network traffic to counter DDoS attacks, in accordance with one or more embodiments of the present disclosure. Process 400 can be implemented at a system such as the system 350 of FIG. 3.

Process 400 starts at 402, at which it is determined whether packets associated with network traffic associated with a first public network address have been dropped. The network traffic can include packets to be forwarded to the first public network address.

At 404, in response to the determination of traffic drop, a second public network address is assigned for the traffic (e.g., the data packets are configured to be forwarded to the second public network address), and a forwarding path corresponding to the second public network address is generated. The second public network address is configured to receive the network traffic, and the forwarding path is used for forwarding network traffic received at the second public network address to the target host.

At 406, a notification is sent to the network filtering device to cause the network filtering device to change the destination of the network traffic from the first public network address to the second public network address, and send filtered network traffic to the second public network address. The forwarded traffic is in turn sent to the target host according to the generated forwarding path by the routing device. Process 400 can be implemented in any suitable computing environment. In this example, process 400 is executed on an SDN. When applied to an SDN-based network, at 402, the SDN determines that network traffic for the first public network address has been dropped. At 404, the SDN assigns a second public network address for the traffic and generates a forwarding path corresponding to the second public network address. The first public network address is used for receiving network traffic, and the forwarding path is used for forwarding network traffic received at the second public network address to the target host.

Even when a network filtering device, e.g., a specialized cloud-based DDoS protection system, is deployed in the communication network, a malicious attacker still is able to obtain the first public network address of the protected target host, and then initiate malicious attacks (e.g., DDoS attacks) directly against the first public network address of the protected target host. Under the malicious attack of a large volume of DDoS traffic, the first public network address associated with the protected target host is subjected to the black hole routing. Thus, legitimate traffic filtered and forwarded by the network filtering device, such as a specialized cloud-based DDoS protection system, is also subject to black hole routing together with the attack traffic sent by the attacker and is discarded as a result of the black hole routing. To prevent legitimate traffic from being affected by DDoS attacks and black hole routing, when it is determined that the first public network address has been subject to the black hole routing as described above, the SDN ensures that legitimate traffic forwarded from the network filtering device to the protected target host is not dropped together with the malicious traffic sent by the attacker, but forwarded normally to the target host. As discussed above, the SDN separately assigns a second public access address to the traffic forwarded so that the legitimate traffic from the network filtering device (as a part of the specialized cloud-based DDoS protection system) to the protected target host is no longer sent together with the attack traffic from the attacker to the same first public network address being black holed. Instead, the legitimate traffic is forwarded to the second public network address, and in turn forwarded to the target host according to a forwarding path newly generated by the SDN and corresponding to the second public network address. Therefore, uninterrupted intended user access to services provided at the target host can be realized. Similarly at 406, it is the SDN that notifies the network filtering device to send network traffic to the second public network address so that the network traffic is forwarded to the target host according to the forwarding path corresponding to the second public network address.

As described above, if both the normal access traffic being returned to the origin that is sent from the specialized DDoS protection system to the protected target host and the malicious attack traffic were sent together to the first public network address that has undergone black hole closure, they would both be forwarded via black hole routing and dropped. To prevent normal traffic from being dropped, the SDN notifies the network filtering device of the second public network access address separately assigned to traffic being returned to the origin, so that the network filtering device sends traffic being returned to the origin to the second public network access address, and this traffic being returned to the origin is then forwarded to the target host via the forwarding path.

Returning to process 400, at 402, to determine that network traffic has been dropped, the SDN receives from the controller a first notification message, which indicates that, when the controller determines that the amount of the traffic sent to a first public network address exceeds a pre-determined threshold, the access traffic to the first public network address is being dropped at the routing device. In response to receiving this notification message, the SDN determines that network traffic has been dropped.

In general, hosts located in the same local area network as the protected host share the same public network address. This public network address serves as the identification for the hosts on the Internet. In order to distinguish the protected target host from the other hosts on the same network, a private network address is assigned to the protected target host. However, because the private network address of the protected target host is not for public access from the Internet, traffic from outside the afore-mentioned local area network, both legitimate and malicious, can only be sent to the afore-mentioned public network address, which is converted to the private network address pre-assigned to the protected target host by using a network address translation service.

Prior to the local area network joining the SDN, the conversion of the public network address to the private address is performed by the controller by invoking a network address translation function and issuing a control command to the routing device. For example, once the controller issues a first public network address to the routing device and confirms that access traffic reaches the first public network address, the controller establishes a one-to-one mapping between the first public network address and the private network address of the protected target host. The controller then utilizes the mapping to generate a forwarding path. The access traffic sent to the first public network address is forwarded to the protected target host according to the forwarding path.

In some embodiments, after the above-described local area network joins the SDN, the conversion of a public network address to a private network address using the network address translation service is no longer performed by the controller issuing a control command to the routing device. Instead, the controller is primarily responsible for monitoring the amount of traffic to the first public network address. If the amount of access traffic sent to the first public network address exceeds a pre-determined threshold, the controller subjects traffic to the first public network address to black hole routing so that the routing device forwards the access traffic to the first public network address via black hole routing. Further, the controller sends a notification message to the SDN to indicate that the controller has already executed black hole filtering on the first public network address. At this point, the conversion of the public network address to a private network address pre-configured to the protected target host is no longer performed by the controller as described above, but by the SDN instead.

Returning to process 400, in some embodiments, at 404, the SDN configures a second public network address for the network traffic and generates a forwarding path corresponding to the second public network address as follows:

First, the SDN utilizes its own control plane to configure a second public network address for the network access traffic. Further, the SDN notifies its own data path plane of the second public network address.

Then, the SDN utilizes the data path plane to generate a forwarding path between the second public network address and the private network address of the target host.

The control plane is logically centralized in the SDN architecture, and can use specialized protocols to issue control commands to the lower level data path plane. In some embodiments, the SDN's control plane first configures a second public network address that is different than the first public network address for the traffic being returned to the origin, and then notifies the SDN's data path plane of the second public network address. Next, the SDN's data path plane updates the forwarding strategy with the second public network address so that the original forwarding path from the first public network address to the protected target host is updated to the new forwarding path from the second public network address to the protected target host. Thus, traffic being returned to the origin that accesses the second public network access address will be forwarded to the protected target host according to the forwarding path.

In some embodiments, after the SDN notifies the network filtering device to send network traffic to the second public network address at 406, the SDN further utilizes its data path plane to issue the new forwarding path to the route forwarding equipment. The SDN also instructs the routing device to send the network traffic to the target host according to the new forwarding path.

After the SDN's data path plane is utilized to update the forwarding strategy with the second public network address, the original forwarding path from the first public network address to the protected target host is updated to a new forwarding path from the second public network address to the protected target host. The SDN further utilizes the data path plane to issue the new forwarding path to the routing device. Thus, in addition to the original forwarding path from the first public network address to the protected target host, the new forwarding path from the second public network address to the protected target host is also included on the routing device. Finally, under the control of both the controller and the SDN, after receiving access traffic for the first public network address, the routing device directly employs the black hole routing to drop such traffic. However, upon receiving traffic to the second public network address, the routing device forwards the traffic to the protected target host according to the new forwarding path.

In some embodiments, after 406 and in addition to the SDN notifying the network filtering device to send network traffic to the second public network address, the SDN further sends a second notification message to the filtering device so that the filtering device updates the forwarding address for the network traffic from the first public network address to the second public network address.

Prior to the filtering device receiving the second notification message from the SDN, the legitimate access traffic forwarded from the filtering device to the protected target host is sent together with the malicious attack traffic from the attacker to the first public network address subject to black hole routing and being dropped. Upon receiving the second notification message from the SDN, the filtering device updates the forwarding address for traffic from the first public network address to the second public network address, and forwards the traffic to the second public network address. The legitimate traffic is then forwarded to the protected target host via the forwarding path from the second public network address to the protected target host.

Figure 5:
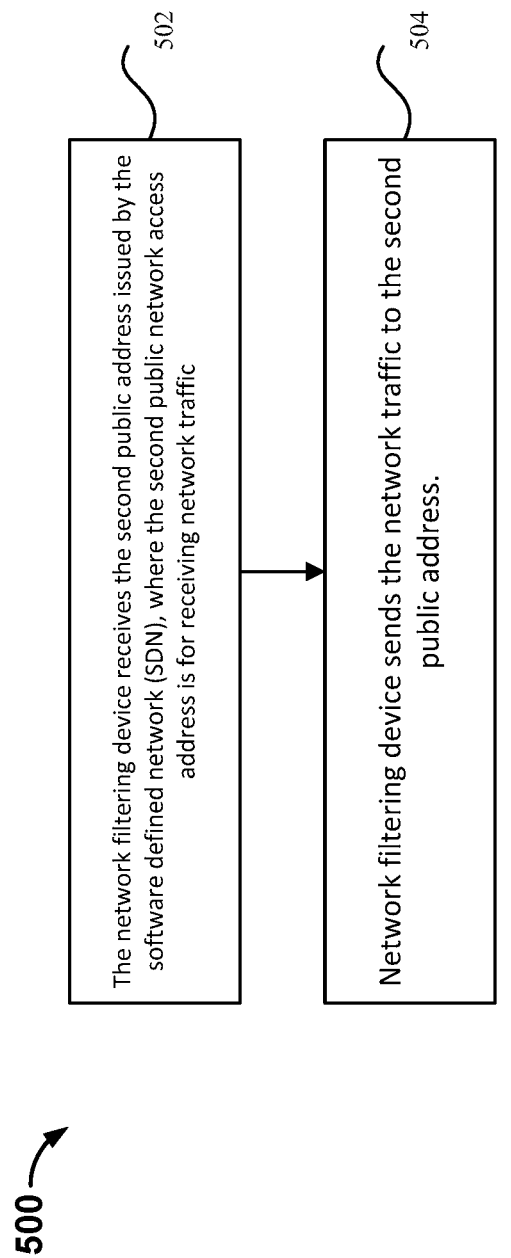
FIG. 5 is a flow chart of another example method for network traffic processing to counter DDoS attacks, in accordance with one or more embodiments of the present disclosure.

FIG. 5 shows another example process for processing network traffic in accordance with one or more embodiments of the present disclosure. Process 500 can be implemented by, for example but is not limited to, the network filtering device 336 of FIG. 3.

At 502, the network filtering device receives a second public network address issued by the SDN, where the second public network address is used for receiving network traffic.

At 504, the network filtering device filters and sends the network traffic to the second public network address.

In this example, before the filtering device receives the second public network address issued by the SDN (502), the filtering device retrieves the first public network address assigned by the controller. Further, the filtering device sends the network traffic according to the first public network address.

In this example, after the filtering device receives the second public network address issued by the SDN (502), the filtering device updates the destination address of the network traffic (e.g., changing the destination field of the packets) from the first public network address to the second public network address.

The conversion from a public network address to a private address and configuration of a second public network address is similar to the description above with respect to FIGS. 3 and 4, and therefore is not repeated for the purpose of simplicity.

Figure 6:
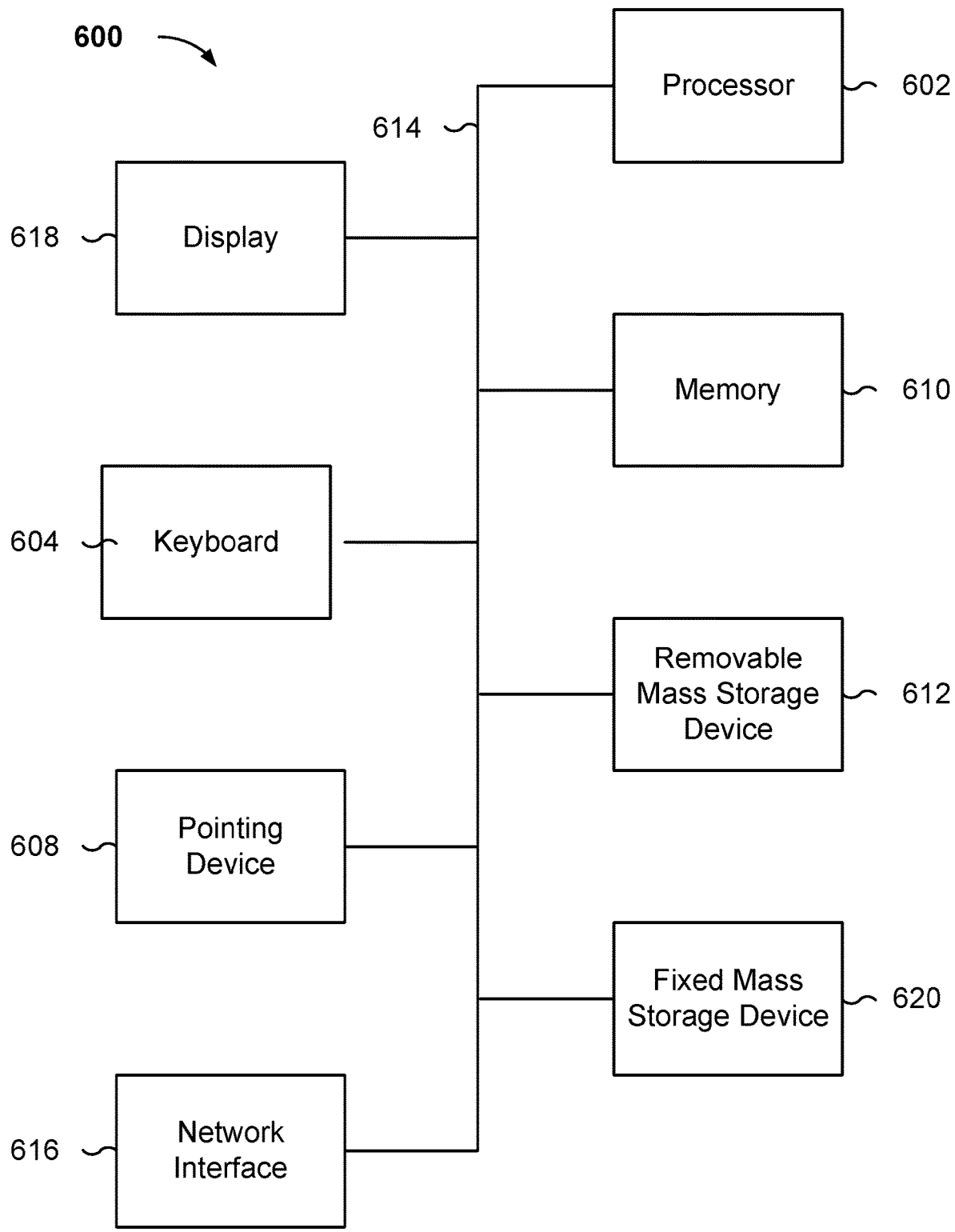
FIG. 6 is a functional diagram illustrating an embodiment of a programmed computer system for processing network traffic to counter DDoS attacks.

FIG. 6 is a functional diagram illustrating an embodiment of a programmed computer system for processing network traffic to counter DDoS attacks. System 600 can be used to implement the SDN, the controller, the network filtering device, and/or the routing device as appropriate. As will be apparent, other computer system architectures and configurations can be used to analyze textual data. Computer system 600, which includes various subsystems as described below, includes at least one microprocessor subsystem (also referred to as a processor or a central processing unit (CPU)) 602. For example, processor 602 can be implemented by a single-chip processor or by multiple processors. In some embodiments, processor 602 is a general purpose digital processor that controls the operation of the computer system 600. Using instructions retrieved from memory 610, the processor 602 controls the reception and manipulation of input data, and the output and display of data on output devices (e.g., display 618).

Processor 602 is coupled bi-directionally with memory 610, which can include a first primary storage area, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 602. Also as is well known in the art, primary storage typically includes basic operating instructions, program code, data, and objects used by the processor 602 to perform its functions (e.g., programmed instructions). For example, memory 610 can include any suitable computer readable storage media, described below, depending on whether, for example, data access needs to be bi-directional or uni-directional. For example, processor 602 can also directly and very rapidly retrieve and store frequently needed data in a cache memory (not shown).

A removable mass storage device 612 provides additional data storage capacity for the computer system 600 and is coupled either bi-directionally (read/write) or uni-directionally (read only) to processor 602. For example, storage 612 can also include computer readable media such as magnetic tape, flash memory, PC-CARDS, portable mass storage devices, holographic storage devices, and other storage devices. A fixed mass storage 620 can also, for example, provide additional data storage capacity. The most common example of fixed mass storage 620 is a hard disk drive. Mass storages 612, 620 generally store additional programming instructions, data, and the like that typically are not in active use by the processor 602. It will be appreciated that the information retained within mass storages 612 and 620 can be incorporated, if needed, in standard fashion as part of memory 610 (e.g., RAM) as virtual memory.

In addition to providing processor 602 access to storage subsystems, bus 614 can also be used to provide access to other subsystems and devices. As shown, these can include a display 618, a network interface 616, a keyboard 604, and a pointing device 608, as well as an auxiliary input/output device interface, a sound card, speakers, and other subsystems as needed. For example, the pointing device 608 can be a mouse, stylus, track ball, or tablet, and is useful for interacting with a graphical user interface.

The network interface 616 allows processor 602 to be coupled to another computer, computer network, or telecommunications network using a network connection as shown. For example, through the network interface 616, the processor 602 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 602 can be used to connect the computer system 600 to an external network and transfer data according to standard protocols. For example, various process embodiments disclosed herein can be executed on processor 602, or can be performed across a network such as the Internet, intranet networks, or local area networks, in conjunction with a remote processor that shares a portion of the processing. Additional mass storage devices (not shown) can also be connected to processor 602 through network interface 616.

An auxiliary I/O device interface (not shown) can be used in conjunction with computer system 600. The auxiliary I/O device interface can include general and customized interfaces that allow the processor 602 to send and, more typically, receive data from other devices such as microphones, touch-sensitive displays, transducer card readers, tape readers, voice or handwriting recognizers, biometrics readers, cameras, portable mass storage devices, and other computers.

The embodiments included in this description are described in a progressive manner. The explanation of each embodiment focuses on areas of difference from the other embodiments, and the descriptions thereof may be mutually referenced for portions of each embodiment that are identical or similar.

A person skilled in the art should understand that an embodiment of the present application may provide methods, devices, or computer program products. Therefore, the embodiments of the present application may take the form of embodiments that are entirely hardware, embodiments that are entirely software, and embodiments that combine hardware and software aspects. Moreover, embodiments of the present application may employ one or more forms of computer products that implement computer-operable storage media (including but not limited to magnetic disk storage devices, CD-ROMs, and optical storage devices) containing computer-operable computer code.

In one typical configuration, the computer equipment comprises one or more processors (CPUs), input/output interfaces, network interfaces, and memory. Memory may include such forms as volatile storage devices in computer-readable media, random access memory (RAM), and/or non-volatile memory, such as read-only memory (ROM) or flash memory (flash RAM). Memory is an example of a computer-readable medium. Computer-readable media, including permanent and non-permanent and removable and non-removable media, may achieve information storage by any method or technology. Information can be computer-readable commands, data structures, program modules, or other data. Examples of computer storage media include but are not limited to phase-change memory (PRAM), static random access memory (SRAM), dynamic random access memory (DRAM), other types of random access memory (RAM), read-only memory (ROM), electrically erasable programmable read-only memory (EEPROM), flash memory or other memory technology, compact disk read-only memory (CD-ROM), digit multifunction disc (DVD) or other optical storage, magnetic cassettes, magnetic tape or magnetic disc storage, or other magnetic storage equipment or any other non-transmission media that can be used to store information that is accessible to computers. As defined in this document, computer-readable media does not include transitory computer-readable media (transitory media), such as modulated data signals and carrier waves.

The embodiments of the present application are described with reference to flowcharts and/or block diagrams based on methods, terminal equipment (systems), and computer program products of the embodiments of the present application. Please note that each flowchart and/or block diagram within the flowcharts and/or block diagrams and combinations of flowcharts and/or block diagrams within the flowcharts and/or block diagrams can be realized by computer commands. These computer program commands can be provided to the processors of general-purpose computers, specialized computers, embedded processor devices, or other programmable data processing terminals to produce a machine. The commands executed by the processors of the computers or other programmable data processing terminal equipment consequently give rise to devices for implementing the functions specified in one or more processes in the flowcharts and/or one or more blocks in the block diagrams.

These computer program commands can also be stored in computer-readable memory that can guide the computers or other programmable data processing terminal equipment to operate in a specific manner. As a result, the commands stored in the computer-readable memory give rise to products including command devices. These command devices implement the functions specified in one or more processes in the flowcharts and/or one or more blocks in the block diagrams.

These computer program commands can also be loaded onto computers or other programmable data processing terminal equipment and made to execute a series of steps on the computers or other programmable data processing terminal equipment so as to give rise to computer-implemented processing. The commands executed on the computers or other programmable data processing terminal equipment thereby provide the steps of the functions specified in one or more processes in the flowcharts and/or one or more blocks in the block diagrams.

Although preferred embodiments of the present application have already been described, a person skilled in the art can make other modifications or revisions to these embodiments once they grasp the basic creative concept. Therefore, the attached claims are to be interpreted as including the preferred embodiments as well as all modifications and revisions falling within the scope of the embodiments of the present application.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A network traffic processing method, comprising:
   determining that one or more packets of first network traffic associated with a first public network address have been dropped, the first public network address being associated with a target host;
   assigning a second public network address to second network traffic and generating a forwarding path corresponding to the second public network address, wherein the second network traffic arrives from a filtering device and is intended for the target host, the second public network address is configured to receive network traffic directed to the target host, and the forwarding path is configured to forward the second network traffic received at the second public network address to the target host; and
   separating legitimate network traffic and malicious network traffic directed to the target host corresponding to the first public network address and the second public network address, the separating comprising:
      notifying the filtering device to transmit the second network traffic to the second public network address and cause the second network traffic to be forwarded to the target host according to the forwarding path; and
      black-hole routing the first network traffic directed to the first public network address that arrives from a device other than the filtering device.

2. The method of claim 1, wherein the determining, assigning, generating and notifying are performed on a software defined network (SDN).

3. The method of claim 1, wherein the determining of whether the one or more packets of the first network traffic associated with the first public network address have been dropped comprises:
   receiving a notification message from a controller, wherein the notification message is transmitted when an amount of the first network traffic sent to the first public network address is determined to exceed a pre-determined threshold, and the notification message indicates that a routing device is to drop first network traffic sent to the first public network address.

4. The method of claim 1, wherein the forwarding path is a path to forward the second network traffic from the second public network address to a private address of the target host.

5. The method of claim 1, wherein the notifying of the filtering device comprises:
   transmitting a notification message to the filtering device, wherein the notification message notifies the filtering device to update a destination address of network traffic corresponding to the first public network address to the second public network address.

6. The method of claim 1, further comprises:
   sending information pertaining to the forwarding path to a routing device; and
   instructing the routing device to forward the second network traffic to the target host according to the forwarding path.

7. A system for processing network traffic, comprising:
   one or more processors configured to:
      determine that one or more packets of first network traffic associated with a first public network address have been dropped, the first public network address being associated with a target host;
      assign a second public network address to second network traffic and generate a forwarding path corresponding to the second public network address, wherein the second network traffic arrives from a filtering device and is intended for the target host, the second public network address is configured to receive network traffic directed to the target host, and the forwarding path is configured to forward the second network traffic received at the second public network address to the target host; and
      separate legitimate network traffic and malicious network traffic directed to the target host corresponding to the first public network address and the second public network address, to separate legitimate network traffic and malicious network traffic comprising:
         notify the filtering device to transmit the second network traffic arriving from an inbound filter to the second public network address and cause the second network traffic to be forwarded to the target host according to the forwarding path; and
         black-hole route the first network traffic directed to the first public network address that arrives from a device other than the filtering device; and
   one or more memories coupled to the one or more processors and configured to provide the one or more processors with instructions.

8. The system of claim 7, wherein the system is a software defined network (SDN).

9. The system of claim 7, wherein to determine whether the one or more packets of the first network traffic associated with the first public network address have been dropped comprises to:
   receive a notification message from a controller, wherein the notification message is transmitted when an amount of the first network traffic sent to the first public network address is determined to exceed a pre-determined threshold, and the notification message indicates that a routing device is to drop network traffic sent to the first public network address.

10. The system of claim 7, wherein the forwarding path is a path to forward the second network traffic from the second public network address to a private address of the target host.

11. The system of claim 7, wherein to notify the filtering device comprises to:
    transmit a notification message to the filtering device, wherein the notification message notifies the filtering device to update a destination address of network traffic corresponding to the first public network address to the second public network address.

12. The system of claim 7, wherein the one or more processors are further configured to:
    send information pertaining to the forwarding path to a routing device; and instruct the routing device to forward the second network traffic to the target host according to the forwarding path.

13. A computer program product for processing network traffic to counter Distributed Denial of Service (DDOS) attacks at a target host, the computer program product being embodied in a non-transitory tangible computer readable storage medium and comprising computer instructions for:
   determining that one or more packets of first network traffic associated with a first public network address have been dropped, the first public network address being associated with the target host;
   assigning a second public network address to second network traffic and generating a forwarding path corresponding to the second public network address, wherein the second network traffic arrives from a filtering device and is intended for the target host, the second public network address is configured to receive network traffic directed to the target host, and the forwarding path is configured to forward the second network traffic received at the second public network address to the target host; and
   separating legitimate network traffic and malicious network traffic directed to the target host corresponding to the first public network address and the second public network address, the separating comprising:
      notifying the filtering device to transmit the second network traffic to the second public network address and cause the second network traffic to be forwarded to the target host according to the forwarding path; and
      black-hole routing the first network traffic directed to the first public network address that arrives from a device other than the filtering device.

14. A network traffic processing method, comprising:
   filtering first network traffic associated with a first public network address and forwarding the filtered first network traffic to the first public network address;
   receiving a second public network address from a software defined network (SDN), the second public network address being associated with second network traffic arriving from an inbound filter that was initially associated with the first public network address; and
   separating legitimate network traffic and malicious network traffic directed to a target host corresponding to the first public network address and the second public network address, the separating comprising:
      forwarding the second network traffic arriving from the inbound filter and directed to the second public network address to a protected host; and
      black-hole routing the first network traffic directed to the first public network address.

15. The method of claim 14, further comprising:
   receiving the first public network address configured by a controller, the first public network address being a destination address associated with the first network traffic.

16. The method of claim 14, further comprising:
   updating a destination address associated with network traffic corresponding to the first public network address to the second public network address.

17. A system for processing network traffic, comprising:
   one or more processors configured to:
      filter first network traffic associated with a first public network address and forward the filtered first network traffic to the first public network address;
      receive a second public network address from a software defined network (SDN), the second public network address being associated with second network traffic that was initially associated with the first public network address; and
      separate legitimate network traffic and malicious network traffic directed to a target host corresponding to the first public network address and the second public network address, to separate the legitimate network traffic and the malicious network traffic comprising:
         forward the second network traffic arriving from an inbound filter and directed to the second public network address to a protected host; and
         black-hole route the first network traffic directed to the first public network address; and
   one or more memories coupled to the one or more processors and configured to provide the one or more processors with instructions.

18. The system of claim 17, wherein the one or more processors are further configured to:
   receive the first public network address configured by a controller, the first public network address being a destination address associated with the first network traffic.

19. The system of claim 17, wherein the one or more processors are further configured to:
   update a destination address associated with network traffic corresponding to the first public network address to the second public network address.

* * * * *

UNITED STATES PATENT AND TRADEMARK OFFICE
CERTIFICATE OF CORRECTION

PATENT NO. : 10,587,637 B2
APPLICATION NO. : 15/643948
DATED : March 10, 2020
INVENTOR(S) : Min Hu et al.

Page 1 of 1

It is certified that error appears in the above-identified patent and that said Letters Patent is hereby corrected as shown below:

On the Title Page

Page 2, Column 1, item (56), cite no. 4, delete "9/2017" and insert --9/2011--, therefor.

Page 2, Column 1, item (56), cite no. 10, delete "Huston, III" and insert --Huston, III et al.--, therefor.

Signed and Sealed this
Eighth Day of September, 2020

Andrei Iancu
*Director of the United States Patent and Trademark Office*